C. H. COVELL.

KEY-HOLE GUARDS FOR LOCKS.

No. 7,720. Reissued June 5, 1877.

Witnesses

Geo. H. Strong

Owyn T. Stacy

Inventor

Calvin H. Covell

By his Atty's

Dewey & Co.

N. PETERS, PHOTO-LITHOGRAPHER, WASHINGTON, D. C.

UNITED STATES PATENT OFFICE.

CALVIN H. COVELL, OF STOCKTON, CALIFORNIA.

IMPROVEMENT IN KEY-HOLE GUARDS FOR LOCKS.

Specification forming part of Letters Patent No. 185,502, dated December 19, 1876; reissue No. 7,720, dated June 5, 1877; application filed March 29, 1877.

*To all whom it may concern:*

Be it known that I, CALVIN H. COVELL, of Stockton, county of San Joaquin and State of California, have invented a new and Improved Door-Lock, of which the following is a specification:

My invention relates to improvements in such door-locks as are secured to doors by being fitted in a recess in the side of the door-stile, and principally on the inside of the door; and it consists in the general construction and arrangement of parts, as will be hereinafter fully described, and pointed out in the claims.

Figure 2:
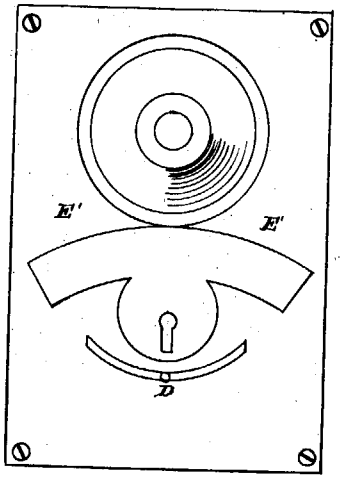
Figure 1:
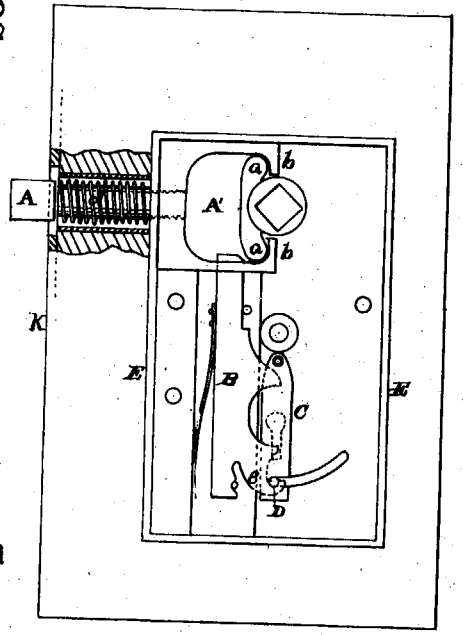

In the accompanying drawing, Figure 1 represents a front view of my improved door-lock with face-plate removed. Fig. 2 is a front view of the face-plate; and Fig. 3, a vertical transverse section of the lock.

In Fig. 1 the lock is represented as applied in the stile of the door, of which K is the outside edge, which closes next to the casing of the door. E is the casing of the lock, in which the operating mechanism of the lock is contained. This case is made smaller than ordinary, and the latch-bolt A is made to project to a considerable distance beyond the case. This latch-bolt is arranged to be attached to or detached from the wider interior section A′ of the bolt inside of the casing by means of a screw on its end, which screws into a screw-hole in the section A′.

Figure 3:
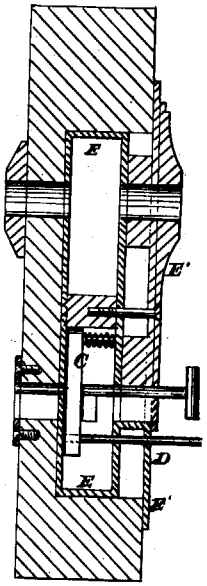

In applying this lock to a door, I make a recess in the face of the door-stile a short distance from the edge of the stile, and corresponding to the shape of the lock-case, thus leaving a strip or narrow portion of the stile between the case of the lock and its edge of the full thickness of the door. I then bore a round auger-hole through this narrow strip from the edge of the stile, and in a line with the interior section A′ of the bolt. After the lock-case has been fitted into its recess I insert the bolt A and its surrounding case through the hole thus bored, and screw its end into the section A′, after which the face-plate E′ is placed over the lock-case, as represented at Fig. 3. The screws which pass through its corners to fasten it in place will enter the wood where the stile is of full thickness.

The sliding latch-bolt A is guided in the casing and operated by turning the knob-spindle in either direction, being engaged by extensions *a* of the guide-socket of the knob-spindle, the extensions bearing against the lugs *b* of the recessed interior part A′ of the latch-bolt. The latch-bolt is acted upon by a spiral spring, *d*, that throws the same instantly forward when the knob is released. The outer section of the latch-bolt A is screwed into the wider interior section A′, and may thereby be readily detached for the purpose of reversing the external section of the latch-bolt, according to the side of the door to which the lock is to be applied. The external section of the latch-bolt is guided in a suitable metal-lined recess of the door, the guide-recess connecting the edge of the door and the lock-casing. The spiral spring *d* is placed outside of the casing E, and around the exterior section of the latch-bolt, between the casing E and the enlarged end of the latch-bolt, which arrangement of the bolt-section and spring produces the width of the casing, and admits the carrying back of the lock from the edge of the door, leaving solid wood where it would otherwise have to be cut away. A vertically-sliding locking-bolt, B, is guided in a suitable manner, and recessed to be engaged by the key. The lock-bolt is thrown forward into a recess of the interior latch-bolt section A′, so as to lock the same, and prevent the turning of the knob and the opening of the door. A pivoted guard-plate, C, swings at the inside of the casing adjoining the wood, and closes, when placed in position, by its operating-pin D, the lock against the introduction of a key or instrument from the outside. The pin D swings in curved slots of the casing and face-plate. The guard-plate forms an additional safeguard against the opening and picking of the lock from the outside. The lock is, therefore, of special advantage for outside doors, hotel, and such other rooms as are desired to be secured from the inside.

A hook-shaped projection, *e*, at the lower part of the lock-bolt B binds on the guard-plate, and prevents the pushing aside of the same from the outside.

Having thus described my invention, what I claim, and desire to secure by Letters Patent, is—

1. The lock-case E, arranged to be fitted in a corresponding-shaped recess in the side of the door-stile, which recess is made at a distance from the outside edge of the stile, in combination with the enlarged face-plate E′, which is arranged to overlap the edges of the case and be secured by screws, which enter the wood opposite the full thickness of the stile, substantially as and for the purpose described.

2. The combination of the locking-bolt B, having the hook-shaped extension *e*, with the operating-pin D of the key-hole guard-plate, to retain the guard-plate in position to close the key-hole, substantially as specified.

In witness whereof I have hereunto set my my hand and seal.

CALVIN HUNN COVELL. [L. S.]

Witnesses:

M. S. THRESHER,

J. N. LONG.